Sept. 11, 1956     O. NÜBLING     2,762,195
ROTARY PUMP AND MOTOR HYDRAULIC TRANSMISSION
Filed Aug. 3, 1953     4 Sheets-Sheet 1

INVENTOR.
Otto Nübling
BY:
Michael S. Stryker
agt.

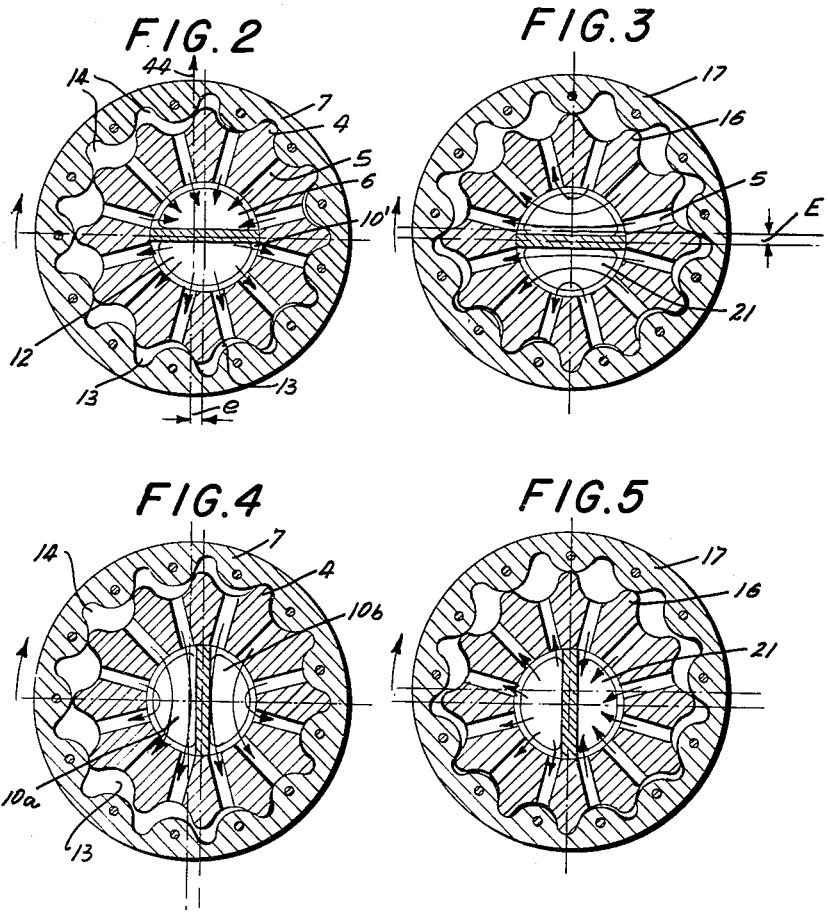

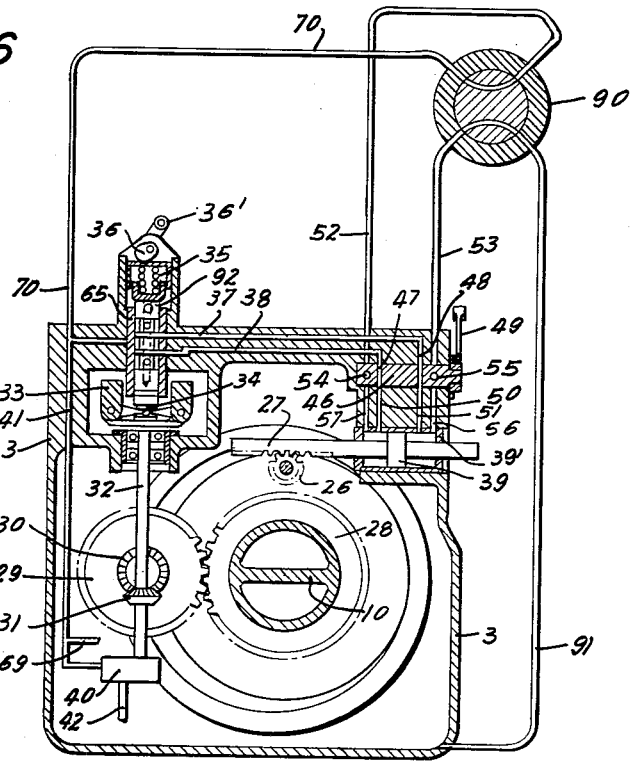
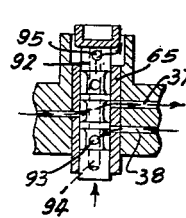
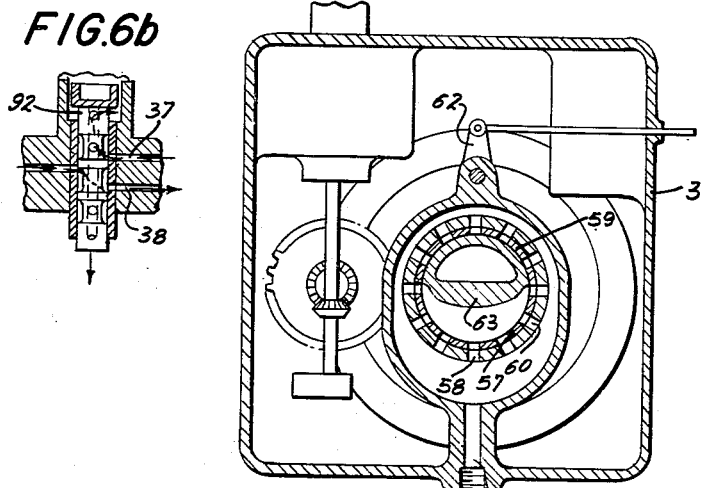

2,762,195
ROTARY PUMP AND MOTOR HYDRAULIC TRANSMISSION

Otto Nübling, Weener (Ems), Germany

Application August 3, 1953, Serial No. 372,056

Claims priority, application Germany August 6, 1952

18 Claims. (Cl. 60—53)

The present invention relates to hydraulic transmissions, and more particularly to an arrangement for simultaneously regulating the pump and the motor of a hydraulic transmission.

The pump and motor means of hydraulic transmissions have to be connected by conduits which cause losses due to friction of the operating fluid in the conduits.

It is one object of the present invention to provide a hydraulic transmission in which a pump and a hydraulic motor are hydraulically connected by control valve which is formed with straight conduits connecting the pump and the motor, respectively.

It is another object of the present invention to combine two control valves required for the regulation of the pump and of the motor, respectively, of the hydraulic transmission in a single control valve permitting simultaneous control and adjustment of the pump and the motor.

It is a further object of the present invention to provide a cooling means for the circulated operating fluid of the hydraulic transmission, and to return through the cooling means the operating fluid discharged by the motor into the pump means.

It is still another object of the present invention to provide a single combined control valve in a hydraulic transmission in which pump and motor means, each consisting of outer and inner members having parallel axes, are arranged with the respective axes in planes which are perpendicular.

It is yet another object of the present invention to turn the control valve by servomotor which is automatically operated by speed responsive means driven by the pump and manually actuated for turning the control valve into a position in which the direction of rotation of the motor is reversed.

It is also an object of the present invention to provide the control valve with spring loaded safety valves, and with a braking valve closing the discharge outlet of the motor for braking the same.

With these objects in view, the present invention mainly consists in a hydraulic transmission, in combination, rotary pump means and hydraulic motor means arranged spaced in axial direction, each of the means including rotary outer and inner members having parallel spaced axes of rotation, the rotary outer and inner members of the pump means and motor means respectively defining suction chamber means increasing in volume, and discharge chamber means decreasing in volume during rotation, each of the inner members being formed with an axial bore, and with radial passages connecting the respective bore with the suction and discharge chamber means of the respective inner member, the inner members and the bores being coaxial, and a hollow tubular control valve located in the bores in the inner members and being turnable therein, the tubular control valve having in the interior thereof a partition defining a supply conduit means and a return conduit means, the supply and return conduit means having first ports communicating with the passages in the inner member of the pump means, and second ports communicating with the passages in the inner member of the motor means, the partition having free edges sliding over the passages of the inner members of the pump means and of the motor means, respectively, during turning of the control valve so that in one position of the control valve the first ports supply and discharge an operating liquid to the suction and discharge chamber means of the pump means, respectively, and the second ports connect the discharge and suction chamber means of the motor means, and in another turned position of the control valve turn in one direction through an angle of substantially 90°, the second ports supply and discharge the operating fluid to the suction and discharge chamber means of the motor means, respectively, and the first ports connect the discharge and suction chamber means of the pump means.

The present invention also consists in an arrangement for automatically controlling the servomotor to turn a control valve between adjusting positions for adjusting the hydraulic transmission, the arrangement also including means for manually controlling the servomotor to turn the control valve into a position causing reversal of the rotation of the hydraulic motor forming part of the hydraulic transmission.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 2, 4, 7 and 9 are cross sectional views through a pump of the hydraulic transmission taken on line 2—2, in Fig. 1 and illustrating different positions of the control valve means;

Figure 1:
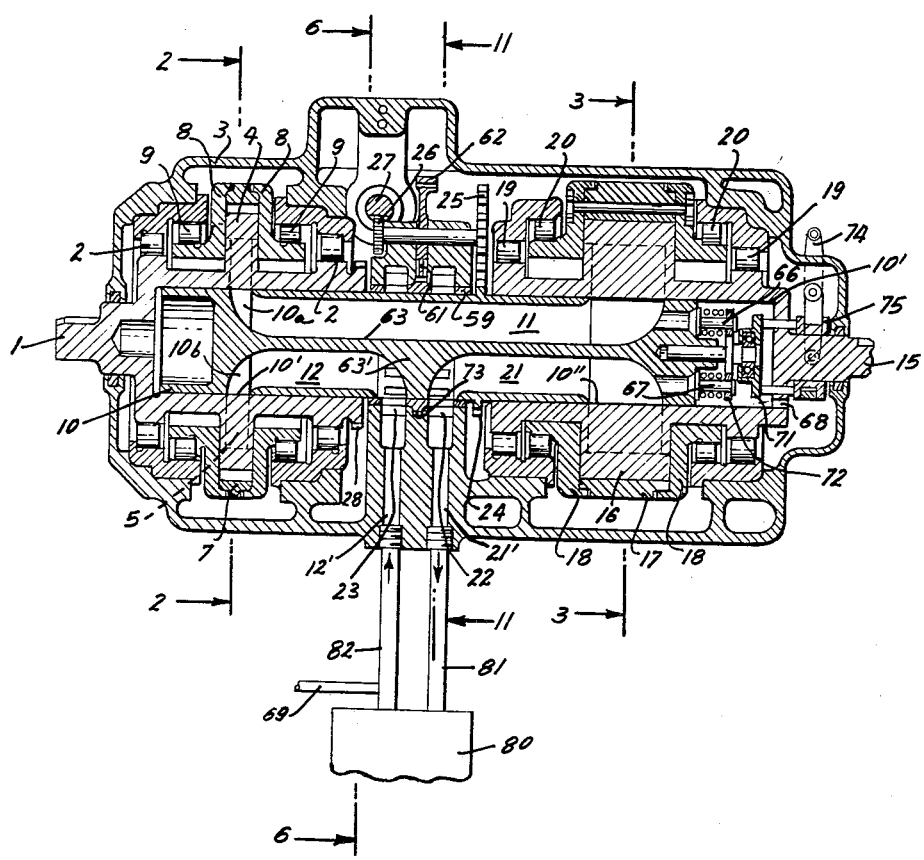
Fig. 1 is an axial sectional view through a hydraulic transmission according to the present invention.

Figs. 3, 5, 8 and 10 correspond to Figs. 2, 4, 7 and 9, respectively, and are cross sectional views through the motor means of the hydraulic transmission taken on line 3—3 in Fig. 1;

Fig. 6 is a cross sectional view taken on line 6—6 in Fig. 1;

Figs. 6a and 6b are fragmentary sectional views on line 6—6 in Fig. 1; and

Fig. 11 is a cross sectional view taken on line 11—11 in Fig. 1 illustrating braking valve means according to the present invention.

Referring now to the drawings and more particularly to Figs. 1 to 10, the hydraulic transmission shown in Fig. 1 consists of a pump means 4, 7 and a hydraulic motor means 16, 17. Pump and motor are of the type in which an outer member is provided with inner teeth and an inner member is provided with outer teeth, the number of teeth of the inner member being one less than the teeth of the outer member. As best seen in Fig. 2, the inner rotary member 4 of the pump means is eccentrically arranged with respect to the outer member 7, the axis of the inner rotary member 4 being parallel to the axis of the outer rotary member 7. As shown in Fig. 3, the motor corresponds to the pump and consists of an inner rotary member 16 cooperating with an outer rotary member 17 and having an axis parallel to the axis of the outer rotary member.

According to the present invention the pump and the motor are arranged in such manner that a first plane defined by the axes of the inner and outer members of the pump is perpendicular to a second plane defined by the axes of the inner and outer members of the motor. The relative position of pump and motor is shown, for instance, in Figs. 2 and 3.

Referring again to Fig. 1, the shaft 1 is driven from a prime mover, such as a diesel motor, and rotatably mounted in the housing 3 in a bearing 2. The rotary inner member 4 of the pump is fixedly mounted on the drive shaft 1. The outer and inner rotary members are laterally bounded by cheek members 8 which are fixedly secured to the outer member 7. Bearings 9 support the outer member 7 in the housing 3. The inner rotary member 16 of the motor is integral with the driven shaft 15. Bearings 19, 20 respectively rotatably support the inner and outer members of the motor in the housing 3. The driven shaft may be used to drive a machine tool, a hoist, or a vehicle.

The inner members 4, 16 of the pump and motor are coaxially arranged and provided wtih inner bores 10', 10" in which a tubular control valve 10 is turnably mounted.

The construction of the hydraulic apparatus used as a pump, or motor, respectively, in the arrangement of the present invention is known per se. As will be understood from Fig. 2, the suction chambers 13 located on one side of the plane defined by the parallel axes of the inner and outer members expand during rotation in the direction of the arrow while the discharge chambers on the other side of the plane contract during rotation. Consequently an operating fluid is sucked through the radial conduits 5 into the chambers 13 and discharged through the radial conduits 5 from the discharge chambers 14 if the control valve 10 is in the position shown in Fig. 2 in which the partition 63 is located in the plane defined by the axes of the rotary inner and outer members 4, 7.

If the control valve is turned through an angle of 90° into the position shown in Fig. 4 in which the suction chambers 13 are connected by the ports 10a and 10b with the contracting chambers 14, no fluid is discharged, the operating fluid or liquid circulates within the pump, and the pump does not drive the motor. The effect of the partition 63 on the motor is similar.

According to the present invention, the pump and motor are arranged in such a manner that the eccentricities e and E, respectively, are perpendicular to each other. A straight partitioning wall 63 diametrically extending through the tubular control valve 10 which is common to both pump and motor will effect in the position shown in Figs. 2 and 3 maximum discharge and suction of the pump, and idle circulation in the motor, and in the position shown in Figs. 4 and 5 idle circulation in the pump and maximum capacity of the motor which, however, is not supplied with operating liquid by the pump in this position of the control valve. If the control valve is turned slightly less than 90°, the motor rotates with a small torque. In the intermediate position shown in Figs. 7 and 8, a portion of the operating liquid is circulated within the pump, while another portion of the operating liquid is supplied to the motor through the conduits 5 and the supply conduit 11 in Fig. 1. The motor capacity is simultaneously adjusted when the control valve 10 is turned.

Figure 7:
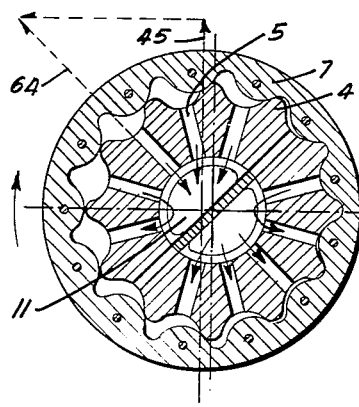
Figure 8:
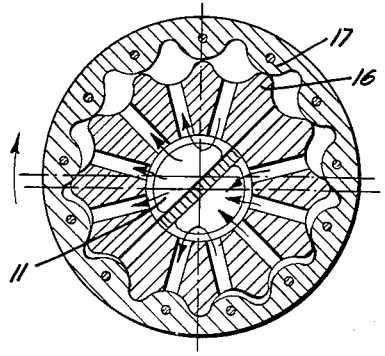

Since a constant torque of the prime mover results in a constant torque of the pump regardless of the position of the control valve 10, the fluid pressure illustrated by the vector 44 results in the maximum pump discharge position of Fig. 2. The resulting fluid pressure must be larger when a smaller amount of fluid is discharged. In Fig. 7 the vector 64 represents the fluid pressure, and its component 45 is the force required for the turning moment. Since the component 45 must be equal to the force 44, the same torque being applied by the prime mover, the fluid pressure 64 is greater in the regulated position shown in Fig. 7 than in the maximum position shown in Fig. 2.

The fluid motor must rotate at the highest rotary speed when the pump has maximum discharge, and on the other hand the pump has minimum discharge when the motor has maximum capacity, and in this event the motor rotates slowly producing a very high torque since the pump operates at high pressure and minimum discharge.

From the above description of the operation of the pump and the motor, respectively, it will be understood that the provision of a combined control valve for the pump and for the motor permits simultaneous control of the pump and motor in a manner which is extremely suitable for an adjustment of the hydraulic transmission.

Since the axes of the outer and inner members of the pump and the axes of the outer and inner members of the motor are arranged in perpendicular planes, the supply conduit 11 and the partition wall 63 are straight as shown in Fig. 1 whereby a frictionless connection between the pump and the motor of the hydraulic drive is obtained. The return conduit from the motor to the pump could be designed as a straight conduit on the other side of the partition similar to the supply conduit 11. Preferably the operating fluid discharged by the motor is guided out of the control valve and through a cooler before it enters the pump.

Referring again to Fig. 1, the partitioning wall 63 in the common control valve 10 divides the interior of the tubular control valve into the supply conduit 11 and the return conduit 21, 12. The supply conduit 11 and the return conduit 21, 12 end in ports located in the inner members 4, 16 and communicate with passages 5. In the embodiment of Fig. 1 the return conduit is divided by a radial wall 63' into a discharge conduit portion 21 having outlet slots 22, and a suction conduit portion 12 having inlet slots 23. The inlet 23 and the outlet 22 communicate through passages 21' and 12' in the housing 3 with the conduits 81, 82 of a cooler 80, so that the operating fluid discharged by the motor heated by friction passes through the cooler 80 and is cooled before entering again the pump of the hydraulic transmission. Consequently the conduits 21, 21', 81, 82, 12', and 12 constitute, together with cooler 80, the return conduit means.

Figure 9:
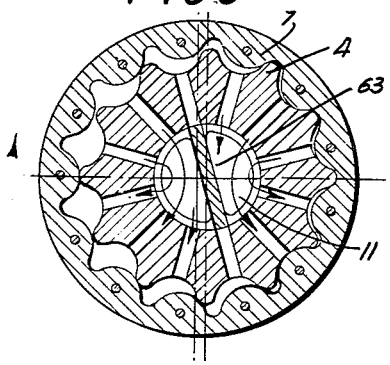
Figure 10:
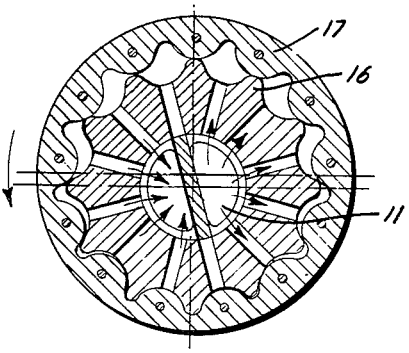

Referring now to Figs. 9 and 10, it will be understood that turning of the control valve 10 into a position in which the partition 63 is turned almost 180°, the direction of rotation of the motor 16, 17 is reversed. As can be seen from Fig. 9, the discharged fluid flows from the pump through the supply conduit 11 into the motor, and Fig. 10 illustrates how in this position of the control valve 10 the operating fluid flows into the motor in such manner as to obtain reverse rotation.

The control valve 10 is further provided with two spring loaded valve means 66 and 67 which automatically open when a predetermined fluid pressure is exceeded in the control valve so that the operating fluid can pass into the housing 3.

The operating fluid discharged through valve 66 or 67 into the housing 3, or leaking from the pump or motor, into the housing is returned by the auxiliary pump 40 shown in Fig. 6 through conduit 69 into the conduit 82 of the cooler 80. The pressure produced by the auxiliary pump 40 in the suction conduit 12 of the pump prevents formation of cavities in the operating fluid. A suitable check valve may be provided in conduit 69.

From the above description it is apparent that the hydraulic transmission is controlled by turning of the control valve 10. According to a preferred embodiment of the present invention, the control valve is operated by a servomotor. A gear ring 24 is fixed on the control valve 10 and meshes with another gear 25 which turns together with pinion 26 cooperating with a rack bar 27. Rack bar 27 is fixedly secured to the piston 39 of a servomotor, best shown in Fig. 6. Consequently, movement of the servomotor piston 39 in the cylinder 39' will effect turning of the control valve 10.

The operation of the control valve 10 by the servomotor 39, 39' is preferably automatic. A gear 28 rotates with the inner member 4 of the pump, and drives another gear 29 from which an auxiliary shaft 32 is driven by means of beveled gears 30, 31. At the end of the shaft 32 centrifugal governor 33 is arranged which shifts the valve member 34 of a valve 65 in accordance with the speed of the pump. A spring 35 acts on the other end of the valve member 34, the tension of the spring being manually adjusted by means of a cam 36 which is operated by lever 36'.

The auxiliary pump means 40 sucks oil through the conduit 42 from a portion of the housing, and presses the oil into the conduit 41. According to the position of the valve member 34, the pressure oil will be pressed either into conduit 37 or into conduit 38 which in the position shown in Fig. 6 are connected by the passages 47 and 48 in the valve 46 with the conduits 50 and 51 which open into the cylinder 39' of the servomotor on both sides of the piston 39.

Consequently, the centrifugal governor and the valve 34, 35 are speed responsive means, and as the speed of the pump increases or decreases, respectively, the pressure fluid produced by the auxiliary pump 40 will flow to one side or the other side of the piston, respectively, and adjust the control valve 10 as required. Automatic regulation of a control valve used with a single hydraulic apparatus is known. According to the present invention, a combined control valve common to pump and motor of a hydraulic transmission is automatically controlled to simultaneously adjust the pump and the motor of a hydraulic transmission.

As pointed out before, in the particular arrangement of the present invention turning of the combined control valve 10 through an angle of greater than 90° will effect a reversal of the rotation of the motor of the transmission. Consequently, the rack bar 27 must move for a greater distance for reversal of the motor than for regulation. The distance through which the piston 39 of the servomotor moves for regulation is the distance between the conduits 50 and 51. For turning the control valve 10 into reversing position, the piston 39 must move through a greater distance, namely the distance between the reversing conduits 56 and 57.

In the position illustrated in Fig. 6 the reversing valve 46 connects the conduits 37, 38 by means of the passages 47, 48 with the conduits 50, 51. When the reversing valve 46 is turned by lever 49 an angle of 90°, the reversing passages 54 and 55, which are spaced the same distance as the reversing conduits 56 and 57, connect the reversing conduits 56, 57 with the reversing conduits 53 and 52. A four-way switching valve 90 connects in one position the reversing conduit 52 with the pressure fluid conduit 70, and the reversing conduit 53 with the return conduit 91 which ends in the housing 3. In the other position of the switching valve 90, conduit 70 is connected to reversing conduit 53, and reversing conduit 52 is connected to return conduit 91.

The arrangement operates as follows: During normal operation the reversing valve 46 is in the position shown in Fig. 6, and the position of the control valve, and thereby the hydraulic transmission is automatically controlled by the speed responsive regulating means 34 and 33.

In the event that reversing of the motor is desired, the reversing valve 46 is turned 90°, whereby the reversing conduits 52, 57 are connected by the reversing passage 54 and the pressure fluid supplied by the auxiliary pump 40 flows through conduit 70, the four-way switching valve 90, and the reversing conduits 52, 57 into the cylinder 39' and forces the piston 39 all the way to the right in Fig. 6 since the conduits 50, 51 are interrupted and ineffective. Such movement of the piston 39 will effect through the transmission means 25, 26, 27 a turning of the control valve into the position shown in Fig. 9 in which the direction of rotation of the motor is reversed. The fluid on the right side of the piston passes through reversing conduits 56, 55, 53 to the valve 90 and from there through conduit 91 into the housing.

In order to return the piston to its normal position it is necessary to turn the four-way switching valve 90 so that the pressure fluid is supplied through the reversing conduits 53, 55 and 56 to the right side of the piston 39, while the fluid on the left side of the piston 39 returns to the housing.

When the reversing valve 46 is again turned to the position shown in Fig. 6 the switching valve 90 becomes ineffective and automatic regulation takes place. In the position of the speed responsive valve 65 shown in Fig. 6, the piston 92 has closed the bores 37 and 38. At an increased number of revolutions, the valve piston 92 is moved upwardly by the centrifugal governor 33 into the position shown in Fig. 6a, and the pressure fluid passes into the conduit 37 as shown by arrows. Correspondingly, the pressure fluid returning through conduit 38 flows into the pump housing through bores 93, 94 and 95.

Fig. 6b illustrates the position of the valve piston 92 when the number of revolutions is reduced. In this event, the pressure fluid enters through bore 38, while flowing out through bore 37.

In the arrangement of the present invention preferably means are provided to separate the pump from the motor regardless of the position of the control valve. For instance, turning of the control valve from the position shown in Fig. 4 through the position shown in Fig. 2 into the position shown in Fig. 9 would produce a torque on the motor and result in excessive pressure effecting opening of the spring loaded valve 66. Therefore, manually operated means are provided for opening the valve 66, 67. A bushing 75 is arranged on the shaft 15 and operated by a lever 74. A member 72 engages the valve stems and is connected to the bushing 75 by means of a bearing ring 71, so that valves 66, 67 can be opened at will by operation of lever 74.

It is known to brake the hydraulic motor of a hydraulic transmission by providing a throttling means in the return conduit of the motor.

According to the present invention a ring-shaped braking valve means 59 is turnably arranged on the control valve 10 as shown in Figs. 1 and 11. In the center of the braking valve 59 gear 73 is provided, which meshes with a toothed segment 61 connected to the lever arm 62. Actuation of the lever arm 62 will cause turning of the braking valve ring 59 between one position in which the slots 60 therein register with slots 58 provided in a surrounding portion of the housing 3, and another position in which the portions 57 between the slots 60 close the slots 58 and prevent discharge of the operating fluid into the conduits 21' and 81 which connect the control valve with the inlet of the cooler. Consequently on the discharge side of the motor high pressure develops which effects braking of the motor. Such pressure, however, is confined by the braking valve ring 58 to the control valve so that the cooler need not be designed for high pressure which is only present in the interior of the control valve 10 protected by the safety valve 67.

It will be understood that each of the elements described above, or two or more together, may also find a useful application in other types of hydraulic transmissions differing from the types described above.

While the invention has been illustrated and described as embodied in a control valve for simultaneously controlling the pump and the motor of a hydraulic transmission and for reversing the motor of the hydraulic transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention

What is claimed as new and desired to be secured by Letters Patent is:

1. In a hydraulic transmission, in combination, rotary pump means and hydraulic motor means arranged spaced in axial direction, each of said means including rotary outer and inner members having parallel spaced axes of rotation, said rotary outer and inner members of said pump means and motor means respectively defining suction chamber means increasing in volume and discharge chamber means decreasing in volume during rotation, each of said inner members being formed with an axial bore and with radial passages connecting the respective bore with the suction and discharge chamber means of the respective inner member, said inner members and said bores being coaxial; and a hollow tubular control valve located in said bores in said inner members and being turnable therein, said tubular control valve having in the interior thereof a partition defining a supply conduit means and a return conduit means, said supply and return conduit means having first ports communicating with said passages in said inner member of said pump means and second ports communicating with said passages in said inner member of said motor means, said partition having free edges sliding over said passages of said inner members of said pump means and of said motor means, respectively, during turning of said control valve so that in one position of said control valve said first ports supply and discharge an operating liquid to said suction and discharge chamber means of said pump means, respectively, and said second ports connect said discharge and suction chamber means of said motor means, and in another turned position of said control valve turned in one direction through an angle of substantially 90° said second ports supply and discharge the operating fluid to said suction and discharge chamber means of said motor means, respectively, and said first ports connect said discharge and suction chamber means of said pump means.

2. In a hydraulic transmission, in combination, rotary pump means and hydraulic motor means arranged spaced in axial direction, each of said means including rotary outer and inner members having parallel spaced axes of rotation, said rotary outer and inner members of said pump means and motor means respectively defining suction chamber means increasing in volume and discharge chamber means decreasing in volume during rotation, the axes of said rotary outer and inner members of said pump means being located in a first plane and the axes of said rotary inner and outer members of said motor means being located in a second plane, which is normal to said first plane, said suction chamber means and discharge chamber means of said pump means and of said motor means being located on opposite sides of said first plane and of said second plane, respectively, each of said inner members being formed with an axial bore and with radial passages connecting the respective bore with the suction and discharge chamber means of the respective inner member, said inner members and said bores being coaxial; and a hollow tubular control valve located in said bores in said inner members and being turnable therein, said tubular control valve having in the interior thereof a diametrical partition defining a supply conduit means and a return conduit menas, said supply and return conduit means having oppositely arranged first ports communicating with said passages in said inner member of said pump means and oppositely arranged second ports communicating with said passages in said inner member of said motor means, said partition having free edges sliding over said passages of said inner members of said pump means and of said motor means, respectively, during turning of said control valve so that in one position of said control valve said partition is turned in one direction into said first plane and said first ports supply and discharge an operating liquid to said suction and discharge chamber means of said pump means, respectively, and said second ports connect said discharge and suction chamber means of said motor means, and in another turned position of said control valve in which said partition is located in said second plane and said second ports supply and discharge the operating fluid to said suction and discharge chamber means of said motor means, respectively, and said first ports connect said discharge and suction chamber means of said pump means.

3. In a hydraulic transmission, in combination, rotary pump means and hydraulic motor means arranged spaced in axial direction, each of said means including rotary outer and inner members having parallel spaced axes of rotation, said rotary outer and inner members of said pump means and motor means respectively defining suction chamber means increasing in volume and discharge chamber means decreasing in volume during rotation, each of said inner members being formed with an axial bore and with radial passages connecting the respective bore with the suction and discharge chamber means of the respective inner member, said inner members and said bores being coaxial; a hollow tubular control valve located in said bores in said inner members and being turnable therein, said tubular control valve having in the interior thereof a partition defining a supply conduit means and a return conduit means, said supply and return conduit means having first ports communicating with said passages in said inner member of said pump means and second ports communicating with said passages in said inner member of said motor means, said partition having free edges sliding over said passages of said inner members of said pump means and of said motor means respectively, during turning of said control valve so that in one position of said control valve said first ports supply and discharge an operating liquid to said suction and discharge chamber means of said pump means, respectively, and said second ports connect said discharge and suction chamber means of said motor means, and in another turned position of said control valve turned in one direction through an angle of substantially 90° said second ports supply and discharge the operating fluid to said suction and discharge chamber means of said motor means, respectively, and said first ports connect said discharge and suction chamber means of said pump means; a radial wall located in the interior of said tubular valve at one side of said partition and dividing said return conduit means into two conduit portions; cooler means; and cooler conduit means connecting said cooler means with said divided conduit portions of said return conduit so that an operating liquid discharged by said motor means into one of said conduit portions passes through said cooler means and the other of said conduit portions before entering said pump means.

4. In a hydraulic transmission, in combination, rotary pump means and hydraulic motor means arranged spaced in axial direction, each of said means including rotary outer and inner members having parallel spaced axes of rotation, said rotary outer and inner members of said pump means and motor means respectively defining suction chamber means increasing in volume and discharge chamber means decreasing in volume during rotation, the axes of said rotary outer and inner members of said pump means being located in a first plane and the axes of said rotary inner and outer members of said motor means being located in a second plane, which is normal to said first plane, said suction chamber means and discharge chamber means of said pump means and of said motor means being located on opposite sides of said first plane and of said second plane, respectively, each of said inner members being formed with an axial bore and with radial passages connecting the respective bore with the suction and discharge chamber means of the respective inner member, said inner members and said bores being coaxial; a hollow tubular control valve located in said bores in said inner members and being turnable therein, said tubular control valve having in the interior thereof a diametrical partition defining a supply conduit means and a return conduit means, said supply and return conduit means having oppositely arranged first ports communicating with said passages in said inner member of said pump means and oppositely arranged second ports communicating with said passages in said inner member of said motor means, said partition having free edges sliding over said passages of said inner members of said pump means and of said motor means, respectively, during turning of said control valve so that in one position of said control valve said partition is turned in one direction into said first plane and said first ports supply and discharge an operating liquid to said suction and discharge chamber means of said pump means, respectively, and said second ports connect said discharge and suction chamber means of said motor means, and in another turned position of said control valve in which said partition is located in said second plane and said second ports supply and discharge the operating fluid to said suction and discharge chamber means of said motor means, respectively, and said first ports connect said discharge and suction chamber means of said pump means; a radial wall located in the interior of said tubular valve at one side and in the middle of said partition and dividing said return conduit means into two conduit portions; cooler means; and cooler conduit means connecting said cooler means with said divided conduit portions of said return conduit and opening into said conduit portions on both sides of said radial wall so that an operating liquid discharged by said motor means into one of said conduit portions passes through said cooler means and the other of said conduit portions before entering said pump means.

5. In a hydraulic transmission, in combination, rotary pump means and hydraulic motor means arranged spaced in axial direction, each of said means including rotary outer and inner members having parallel spaced axes of rotation, said rotary outer and inner members of said pump means and motor means respectively defining suction chamber means increasing in volume and discharge chamber means decreasing in volume during rotation, the axes of said rotary outer and inner members of said pump means being located in a first plane and the axes of said rotary inner and outer members of said motor means being located in a second plane, which is normal to said first plane, said suction chamber means and discharge chamber means of said pump means and of said motor means being located on opposite sides of said first plane and of said second plane, respectively, each of said inner members being formed with an axial bore and with radial passages connecting the respective bore with the suction and discharge chamber means of the respective inner member, said inner members and said bores being coaxial; and a hollow tubular control valve located in said bores in said inner members and being turnable therein, said tubular control valve having in the interior thereof a diametrical partition defining a supply conduit means and a return conduit means, said supply and return conduit means having oppositely arranged first ports communicating with said passages in said inner member of said pump means and oppositely arranged second ports communicating with said passages in said inner member of said motor means, said partition having free edges sliding over said passages of said inner members of said pump means and of said motor means, respectively, during turning of said control valve so that in one position of said control valve said partition is turned in one direction into said first plane and said first ports supply and discharge an operating liquid to said suction and discharge chamber means of said pump means, respectively, and said second ports connect said discharge and suction chamber means of said motor means, and in another turned position of said control valve in which said partition is located in said second plane and said second ports supply and discharge the operating fluid to said suction and discharge chamber means of said motor means, respectively, and said first ports connect said discharge and suction chamber means of said pump means, further turning of said control valve in said direction from said other position to a third position effecting reversal of the direction of rotation of said motor means.

6. In a hydraulic transmission as claimed in claim 2, in combination, servomotor means; transmission means connecting said servomotor means with said turnable control valve; an auxiliary pump adapted to supply a pressure fluid; two conduit means connecting said auxiliary pump with said servomotor means; speed responsive regulator means driven by said pump means and including a regulating valve means located in said conduit means for operating said servomotor means whereby said control valve is adjusted in accordance with the rotary speed of said pump means.

7. In a hydraulic transmission as claimed in claim 5, in combination, servomotor means; transmission means connecting said servomotor means with said turnable control valve; an auxiliary pump adapted to supply a pressure fluid; two reversing conduit means connecting said auxiliary pump with said servomotor means; switching valve means in said reversing conduit means for reversing the flow of fluid in the same for actuating said servomotor means to move to a position corresponding to turning of said control valve through substantially 180° and back.

8. In a hydraulic transmission including a pump means and a motor means, in combination, a control valve turnable between a first and a second position for regulating the hydraulic transmission, and further turnable to a third position for reversing the motor means; servomotor means; transmission means connecting said servomotor means with said turnable control valve; an auxiliary pump adapted to supply a pressure fluid; conduit means connecting said auxiliary pump with said servomotor means; speed responsive rotary governor means connected to the pump means for rotation; a regulating valve means operated by said governor means and located in said conduit means for operating said servomotor means in accordance with the rotary speed of said pump means between two positions corresponding to said first and second positions of said control valve, whereby said control valve is automatically adjusted to the rotary speed of said pump means; reversing conduit means connecting said auxiliary pump with said servomotor means; switching valve means for reversing the flow of fluid in said reversing conduit means for actuating said servomotor to move between two other farther spaced positions corresponding to turning of said control valve to said third position and back.

9. In a hydraulic transmission as claimed in claim 5, in combination, servomotor means; transmission means connecting said servomotor means with said turnable control valve; an auxiliary pump adapted to supply a pressure fluid; conduit means connecting said auxiliary pump with said servomotor means; speed responsive rotary governor means connected to the pump means for rotation; a regulating valve means operated by said governor means and located in said conduit means for operating said servomotor means in accordance with the rotary speed of said pump means between two positions corresponding to said first and second positions of said control valve, whereby said control valve is automatically adjusted to the rotary speed of said pump means; reversing conduit means connecting said auxiliary pump with said servomotor means; switching valve means for reversing the flow of fluid in said reversing conduit means for actuating said servomotor to move between two other farther spaced positions corresponding to turning of said control valve to said third position and back.

10. An arrangement as claimed in claim 9 wherein said transmission means include gear means connected to said turnable control valve for rotation, and a rack bar meshing with said gear means; and wherein said servomotor means is composed of cylinder and piston elements, one of said elements being reciprocable, and connected to said rack bar.

11. An arrangement as claimed in claim 8 wherein said servomotor means is composed of a cylinder and a piston, said cylinder communicating with said reversing conduit means at two points located on either side of said piston and with said conduit means at two points located at either side of said piston and inside said first mentioned points; and including a manually operated reversing valve means movable between two positions and having two pairs of angularly spaced valve passages cooperating respectively with said two conduit means and said two reversing conduit means, one pair of said valve passages being spaced the same distance as said reverse conduits, and the other pair of said valve passages being spaced the same distance as said conduit means, one pair of said passages in said reversing valve means being located in one of said valve positions in said conduit means to permit flow of said fluid through said conduit means, and the other pair of passages being located in the other of said valve positions in said reversing conduit means to permit flow through said reverse conduit means.

12. In a hydraulic transmission, in combination, rotary pump means and hydraulic motor means arranged spaced in axial direction, each of said means including rotary outer and inner members having parallel spaced axes of rotation, said rotary outer and inner members of said pump means and motor means respectively defining suction chamber means increasing in volume and discharge chamber means decreasing in volume during rotation, each of said inner members being formed with an axial bore and with radial passages connecting the respective bore with the suction and discharge chamber means of the respective inner member, said inner members and said bores being coaxial; a hollow tubular control valve located in said bores in said inner members and being turnable therein, said tubular control valve having in the interior thereof a partition defining a supply conduit means and a return conduit means, said supply and return conduit means having first ports communicating with said passages in said inner member of said pump means and second ports communicating with said passages in said inner member of said motor means, said partition having free edges sliding over said passages of said inner members of said pump means and of said motor means, respectively, during turning of said control valve so that in one position of said control valve said first ports supply and discharge an operating liquid to said suction and discharge chamber means of said pump means, respectively, and said second ports connect said discharge and suction chamber means of said motor means, and in another turned position of said control valve turned in one direction through an angle of substantially 90° said second ports supply and discharge the operating fluid to said suction and discharge chamber means of said motor means, respectively, and said first ports connect said discharge and suction chamber means of said pump means; a radial wall located in the interior of said tubular valve at one side of said partition and dividing said return conduit means into two conduit portions communicating respectively with said pump means and said motor means; cooler means; cooler conduit means connecting said cooler means with said divided conduit portions of said return conduit so that an operating liquid discharged by said motor means into one of said conduit portions passes through said cooler means and the other of said conduit portions before entering said pump means; a braking valve member located intermediate said cooler conduit means and the conduit portion of said return conduit communicating with said motor means; and means for operating said braking valve member for braking said motor means by at least partly closing said braking valve member.

13. An arrangement as claimed in claim 12 wherein said braking valve member is a ring turnably mounted on said tubular control valve and formed with slots; and including an annular housing portion surrounding said ring and being formed with slots corresponding to said first mentioned slots, and wherein said operating means turn said ring between a normal position in which said slots in said housing portion are aligned with said slots in said ring, and a braking position in which said slots are at least partly staggered.

14. In a hydraulic transmission including pump means and motor means; a tubular control valve for regulating the transmission and being formed with a supply conduit for supplying an operating liquid from said pump means to said motor means and with a discharge conduit communicating with said motor means and having an outer opening on the outer surface of said tubular control valve, said tubular control valve being formed with a suction conduit communicating with said pump means and having an inlet opening on said outer surface of said tubular control valve; cooler means communicating on one hand with said outlet port and on the other hand with said inlet port; and a brake valve member located intermediate said cooler means and said outlet and movable between an open position and an at least partly closed position blocking discharge from said motor means into said cooler means whereby said motor means is braked.

15. An arrangement as claimed in claim 14 wherein said brake valve member is a slotted ring, and including an annular slotted housing portion surrounding said slotted ring; and means for turning said slotted ring.

16. A hydraulic transmission as claimed in claim 2 and including a spring loaded valve mounted on said control valve and connecting in open position said supply conduit means with the outside; and another spring loaded valve mounted on said control valve and connecting in open position said return conduit means with the outside, said spring loaded valves being adapted to relieve over pressure in said control valve.

17. An arrangement as claimed in claim 14 and including a spring loaded valve mounted on said control valve and communicating with said discharge conduit, said spring loaded valve adapted to relieve over pressure created by closing said brake valve member.

18. A hydraulic transmission as claimed in claim 2 and including a spring loaded valve mounted on said control valve and connecting in open position said supply conduit means with the outside; another spring loaded valve mounted on said control valve and connecting in open position said return conduit means with the outside, said spring loaded valves being adapted to relieve over pressure in said control valve; and manually operated means for opening said spring loaded valve at will.

References Cited in the file of this patent

UNITED STATES PATENTS

| | | |
|---|---|---|
| 1,628,603 | Ferris | May 10, 1927 |
| 1,904,496 | Maw | Apr. 18, 1933 |
| 1,924,017 | Bedford | Aug. 22, 1933 |
| 2,221,308 | Dischert | Nov. 12, 1940 |
| 2,500,580 | Segsworth | Mar. 14, 1950 |
| 2,509,321 | Topanelian | May 30, 1950 |
| 2,650,573 | Hickman | Sept. 1, 1953 |